United States Patent [19]

Kelly et al.

[11] 3,895,595

[45] July 22, 1975

[54] PAIRED CABLE DRAG REDUCTION WITH NON-NEWTONIAN FLUIDS

[75] Inventors: Raymond E. Kelly; Richard E. Lovejoy, both of Panama City, Fla.

[73] Assignee: The United States of America as represented by the Secretary of the Navy, Washington, D.C.

[22] Filed: Feb. 11, 1974

[21] Appl. No.: 441,724

[52] U.S. Cl............................ 114/235 F; 114/67 R
[51] Int. Cl.²..................... B63B 21/56; B63B 1/34
[58] Field of Search ............ 114/235 F, 67 A, 67 R

[56] References Cited
UNITED STATES PATENTS

| | | | |
|---|---|---|---|
| 3,289,623 | 12/1966 | Gray et al. | 114/67 A |
| 3,368,514 | 2/1968 | Kelly | 114/235 F |

*Primary Examiner*—Trygve M. Blix
*Assistant Examiner*—Gregory W. O'Connor
*Attorney, Agent, or Firm*—Richard S. Sciascia; Don D. Doty; Harvey A. David

[57] ABSTRACT

An underwater towing cable system is described wherein a non-Newtonian fluid is pumped from a towing ship reservoir, through a supply passage extending substantially the length of a faired cable assembly, for distribution through pores into a boundary layer of water adjacent the cable assembly. The pores may be limited to predetermined portions of the cable assembly and may be characterized by effective areas that increase proportional to position along the cable length, whereby fluid distribution is uniform irrespective of frictional losses in the supply passage.

11 Claims, 8 Drawing Figures

PATENTED JUL 22 1975  3,895,595

PAIRED CABLE DRAG REDUCTION WITH NON-NEWTONIAN FLUIDS

STATEMENT OF GOVERNMENT INTEREST

The invention described herein may be manufactured and used by or for the Government of the United States of America for Governmental purposes without the payment of any royalties thereon or therefor.

FIELD OF THE INVENTION

This invention relates to underwater towing cables, and more particularly to the reduction of frictional drag and turbulence experienced by such cables when towing an object that runs at a substantial depth.

DISCUSSION OF THE PRIOR ART

Various underwater instrumentalities, some of a military nature and some not, are required to be towed by a surface vessel connected to the towed device by a cable of considerable length. In the past, efforts to reduce drag and vibration have been confined to addition of fairing means to the cable. Early examples of these are found in U.S. Pat. No. 2,435,956, and U.S. Pat. No. 3,368,514. The former provides a solid streamlined fairing that is attached to the cable, and the latter provides a plurality of limp, flexible streamers or thrums that are looped between strands of a cable. While these devices, as well as others using the same basic concepts, serve to reduce drag and vibration, there remains room for improvement.

Reduction of hydraulic frictional drag on ship hulls, torpedoes, turbine blades, and the like has been proposed to be accomplished by providing a quantity of a non-Newtonian fluid into the laminar flow region adjacent to a hull or other surface experiencing relative motion with respect to water. Various suitable non-Newtonian fluids, generally of a long molecular polymer structure, have been identified and are known to those skilled in the art to which the invention pertains. Application of the use of such non-Newtonian fluids to drag reduction problems has been limited to relatively large areas presented by solid objects, e.g., ship hulls, hydrodynamic pipe lines, and the like. Those applications are generally characterized by relatively fixed conditions of use with respect to water pressures, and sufficient space in the apparatus concerned for the typical plumbing required to implement the injection of the non-Newtonian fluid into the zone of laminar flow. Underwater towing cables, on the other hand, are normally subjected to a wide variety of towing rates, loads, depths, and pressures of operation. Cable size limitations are always a matter of practical consideration regarding handling, stowage, and operational characteristics.

BRIEF SUMMARY OF THE INVENTION

The present invention aims to overcome some of the drag, noise, and other problems of underwater towing cables through a novel combination of fairing means and use of non-Newtonian fluids.

Accordingly, it is a principal object of the invention to provide an improved towing cable system including a faired cable having non-Newtonian fluid distributing capability throughout its length, a shipboard reservoir for non-Newtonian fluids, and pumping and metering means for supplying the fluids to the cable.

Another object of the invention is the provision of a cable of the foregoing character that comprises means defining a fluid supply passage or gallery longitudinally of the cable, and a multitude of pores or other discharge openings communicating between the gallery or supply passage and the exterior of the cable, the discharge openings being so sized and/or spaced that all, or selected, portions of the cable are provided with appropriate amounts of non-Newtonian fluid irrespective of the fact that frictional losses occur in the fluid as it progresses to more remote portions of the cable.

Still another object of the invention is the provision of a faired cable construction that can utilize conventional cable fairing techniques, i.e., thrums inserted between the strands of a multistrand cable or streamlined fairing sections strung along the multistrand cable, by providing one or more of the cable strands with the aforementioned supply passage and discharge openings.

As another object the invention aims to take advantage of the presence of the cable supply passage to feed non-Newtonian fluid to the towed device for release through outlet openings in the forward part of the hull thereof, thereby eliminating a requirement of a fluid reservoir within the towed device hull.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
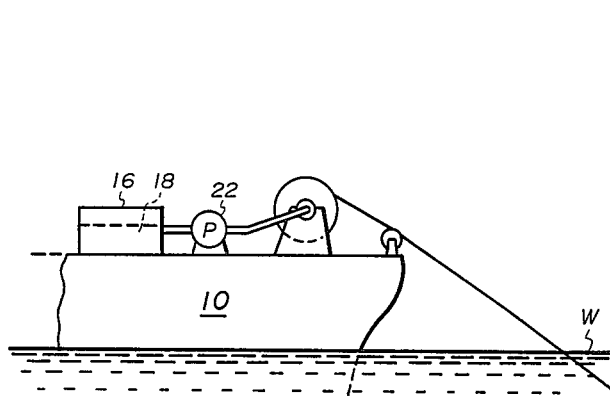
FIG. 1 is a diagrammatic illustration of a towing cable system embodying the invention.

In the form of the invention illustrated in FIG. 1, a ship 10, afloat in water W, is connected by a towing cable 12 to a towed underwater device 14. Device 14 is merely representative of any one of a number of possible objects or devices that it may be desirable to tow at a predetermined water depth, and so will not be described in detail. Suffice it to say that, in order to tow the device 14 at a desired depth and speed, with a desired degree of vibration free quietness when the device includes sensitive instrumentation, it is necessary that cable 12 experience as little drag and vibration from the water environment as is possible.

Ship 10 is provided with a tank or reservoir 16 in which is contained a quantity of a non-Newtonian fluid 18. By a non-Newtonian fluid is meant, for the purposes herein, a liquid that has marked non-Newtonian characteristics that make it suitable as a drag reducing agent when introduced into zones of laminar flow of water in the boundary layer adjacent a submerged surface. Fluids such as long chain polymers, either alone, or suspended in a light fluorocarbon carrier, are well known for this purpose, examples being found in U.S. Pat. No. 3,727,570 to John Molinski.

Cable 12, the construction of which will be described in more detail hereinafter, is adapted to be supplied with fluid 18 from reservoir 16, for example by means of a pump 22, which fluid becomes distributed into the boundary layer regions along selected portions of the cable. In general, the distribution is most effective along those portions of cable 12 nearest the towed device 14.

Figure 3:
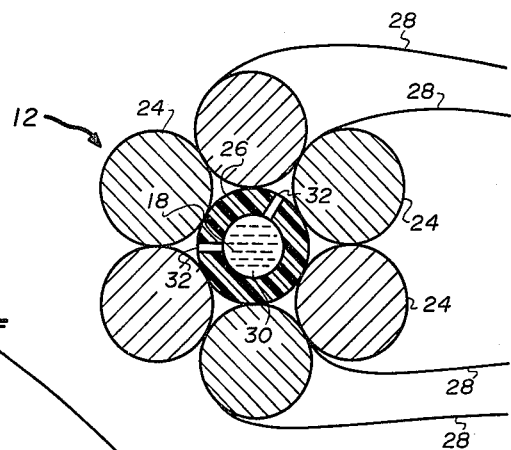
FIG. 3 is a sectional view, on an enlarged scale, of the cable portion of FIG. 2, taken substantially along line 3—3 thereof.
Figure 2:
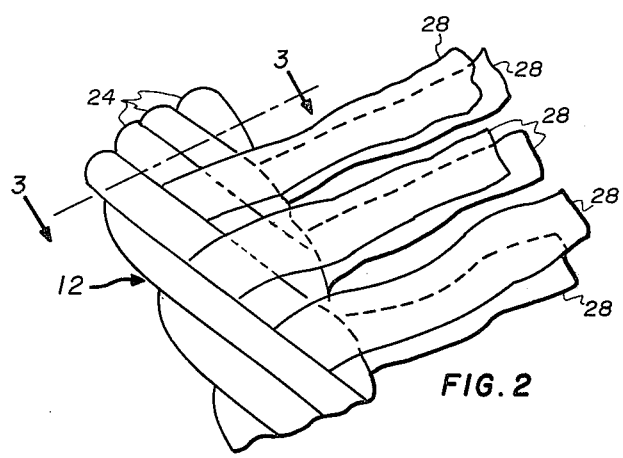
FIG. 2 is an enlarged fragmentary view of a cable portion of the system of FIG. 1.

Referring now to FIGS. 2 and 3, cable 12 is seen to comprise a plurality of outer strands 24, laid in a conventional manner about a central core strand 26. Extending from between outer strands 24, are a plurality of flexible, limp streamers, ribbons, or thrums 28. Thrums 28, are of the same character, and serve the same purpose of fairing, as described in U.S. Pat. No. 3,368,514 The self-aligning, cable streamlining function of such thrums is now well known to those skilled in the art to which the invention pertains.

Core strand 26 has defined therein a fluid conducting central passage 30, extending substantially the length of the cable and into which non-Newtonian fluid 18 is injected or forced under pressure, as by pump 22. The wall of core strand 26 is provided with a plurality of outlet passages or pores 32 communicating between central passage 30 and the exterior of the core strand. A large number of pores 32 are provided along substantially the full length of core strand 26, the pores serving to allow fluid 18 to flow from passage 30 to the outside of the core strand, and thence between the outer strands 24 to wet thrums 28 and to mix with the boundary layer water adjacent thereto.

Because those portions of cable 12 that are at greater depths during towing are more remote from the supply of fluid, the friction experienced by the non-Newtonian fluid in traveling thereto may render it necessary to provide greater restriction to flow of fluid 18 from passage 30 at less remote portions of the cable than at the more remote portions in order to achieve substantially uniform distribution of the non-Newtonian fluid in the boundary layer water along the selected length of the cable. This may be accomplished by utilizing pores 32 of smaller diameters along the less remote portions of the core strand 26, and larger diameters along the more remote portions thereof. That is to say, the pore diameters may be sized so that the effective areas thereof increase in proportion to distance from the source of fluid 18 under pressure. Alternatively, this may be accomplished by utilizing pores of like diameter throughout the selected portion of cable that is to be served with a distribution of non-Newtonian fluid, but having a pore density, and hence effective area, that increases in proportion to distance from the fluid supply. Also, a combination of these expedients may be used to achieve the required flow distribution of fluid 18 into a boundary layer along the cable and the flexible ribbons or thrums 28 thereof.

As may be seen in FIG. 1, the hull of device 14 may be provided with an internal passage or conduit 30a that receives non-Newtonian fluid 18 from supply passage 30, and distributes it to outlet pores or openings 32a in the hull of the towed device. Device 14 may thereby benefit from the drag reducing properties of fluid 18 without requiring an internal reservoir therefor.

Figure 4:
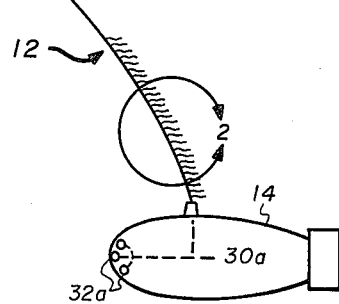
FIG. 4 is a sectional view, similar to that of FIG. 3, but illustrating another embodiment.

Referring now to FIG. 4, illustrating another embodiment of the invention, a cable 12' is illustrated comprising a plurality of outer strands 24' laid in conventional manner about a core strand 26'. In this embodiment, at least one of the outer strands 24' is provided with a fluid conducting central passage 30' and outlet pores 32' along its length, or some portion thereof. Pores 32' are sized or arranged as described with respect to pores 32 to achieve even distribution of fluid 18 being forced into passage 30' by a pump such as pump 22. While cable 12' is illustrated without fairing thrums, it will be understood that flexible thrums such as thrums 28 of FIGS. 2 and 3 can be used with cable 12'.

Figure 5:
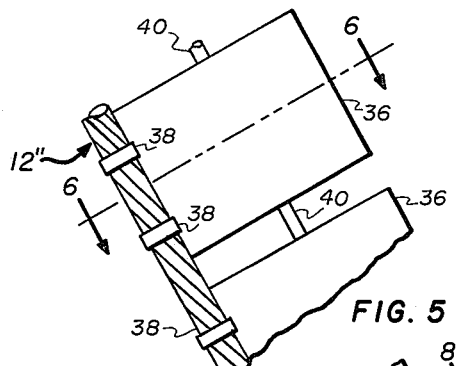
FIG. 5 is a fragmentary side elevational view of another form of cable fairing in association with the cable of FIG. 4.
Figure 6:
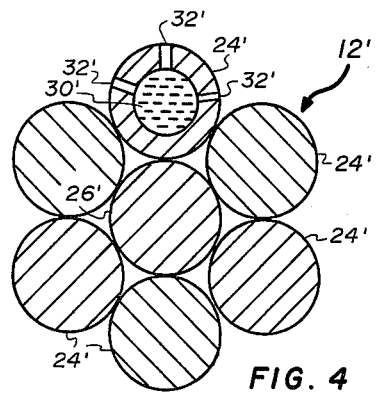
FIG. 6 is a sectional view, on an enlarged scale, taken substantially along line 6—6 of FIG. 5.

Turning to FIGS. 5 and 6, an alternative fairing construction is illustrated for use in assembly with a cable 12" wherein that cable may utilize either the core strand fluid distribution means described with reference to FIGS. 2 and 3, the outer strand fluid distribution means described with reference to FIG. 4, or both. In this embodiment, hydrodynamically shaped fairing elements 36 are connected to the cable 12" by suitable bales or clips 38, and are flexibly interconnected by links 40. Links 40 serve to maintain the fairing elements in predetermined positional relationships to one another during use. Non-Newtonian fluid expressed from pores of one or more strands of cable 12" mix with water flowing therepast and becoming part of the boundary layer 42 thereof adjacent the surfaces of fairing sections 36 to reduce drag on the entire assembly.

Figure 7:
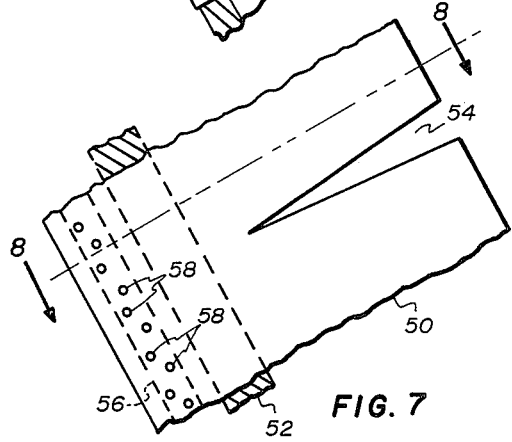
FIG. 7 is a fragmentary side elevational view of another embodiment of the invention.
Figure 8:
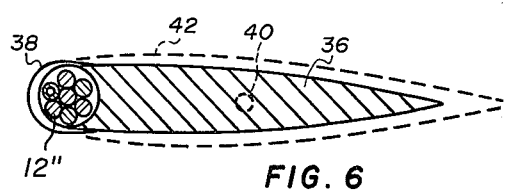
FIG. 8 is a sectional view, taken substantially along line 8—8 of FIG. 7.
Figure 8:
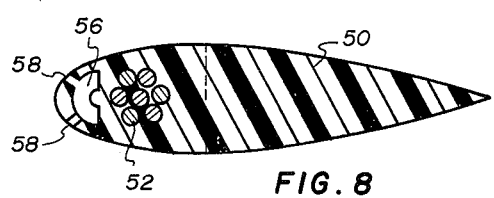

FIGS. 7 and 8 illustrate yet another embodiment wherein a cable and a solid fairing are integral. In this embodiment a resiliently flexible, substantially solid fairing 50 is molded around a flexible strength member, such as a cable 52. The fairing 50 may have darts or cut out areas 54 in the trailing edge thereof to permit a curve to form in the cable and fairing when in use towing an underwater device. A fluid conducting passage 56 is formed in the nose portion of the fairing 50, this passage running substantially the length of the fairing. Outlet pores 58 communicate between passage 56 and the exterior of the fairing for distribution of non-Newtonian fluid into boundary layer water flowing over the surfaces of the fairing. As before with pores 32, 32', the effective areas of pores 58 may vary through the length of the cable and fairing such that appropriate amounts of non-Newtonian fluid are discharged into the water at all depths.

Obviously, other embodiments and modifications of the subject invention will readily come to the mind of one skilled in the art having the benefit of the teachings presented in the foregoing description and the drawings. For example, instead of having pump 22 disposed between the reservoir and the cable, a pump or other source of air pressure may be used to increase pressure on the surface of fluid in the reservoir, thereby forcing it, via suitable control valve means, into cable 12. It is, therefore, to be understood that this invention is not to be limited thereto and that said modifications and embodiments are intended to be included within the scope of the appended claims.

What is claimed is:

1. Towing cable apparatus for towing an underwater object from a towing ship in an aqueous medium, said apparatus comprising:
a towing shipboard reservoir for containing a supply of fluid having pronounced non-Newtonian characteristics;
a flexible towing cable comprising means for defining at least one elongate supply passage along a substantial portion of the cable length;
means, connected to said reservoir, for injecting non-Newtonian fluid from said reservoir into said supply passage under pressure; and
said cable being characterized by a plurality of outlet pores communicating between said supply passage and the exterior of said means for defining said passage, said pores being sized and spaced so that the effective areas thereof increase in proportion to distance from said means for injecting, whereby said fluid is distributed into a boundary layer of said aqueous medium adjacent the surface of said cable substantially uniformly along a predetermined portion of the length thereof.

2. Apparatus as defined in claim 1, and wherein said cable is further characterized by:
a flexible, multistrand strength member;
a streamlined fairing portion, molded about said strength member, said fairing portion having a curved nose portion, disposed on one side of said strength member, and a tapering trailing portion extending beyond the other side of said strength member; and
said supply passage being defined in said nose portion and extending parallel to said strength member.

3. Apparatus as defined in claim 1, and wherein:
said cable comprises a plurality of cable strands including a core strand and a plurality of outer strands laid around said core strand;
said means for defining said supply passage comprises at least one of said strands; and
said pores comprise pores of smaller diameters along portions of said one of said cable strands that are less remote and pores of larger diameters along portions thereof that are more remote from said means for injecting.

4. Apparatus as defined in claim 3, and further comprising:
fairing means, attached to said cable, for presenting a hydrodynamically favorable shape to said boundary layer.

5. Apparatus as defined in claim 4, and wherein said towed underwater object comprises:
a streamlined hull connected to said cable;
fluid conduit means, in communication with said supply passage, for carrying said fluid through said hull; and
outlet openings defined in said hull and connected to said fluid conduit means.

6. Apparatus as defined in claim 4, and wherein said fairing means comprises:
a plurality of elongate, flexible thrums extending from between said strands.

7. Apparatus as defined in claim 4 and wherein said fairing means comprises:
a plurality of solid streamlining elements disposed along said cable and each presenting convexly curved side surfaces; and
link means, interconnecting said streamlining elements, for maintaining predetermined positional relationships therebetween.

8. Apparatus as defined in claim 6, and wherein:
said one of said cable strands comprises said core strand.

9. Apparatus as defined in claim 6, and wherein:
said one of said cable strands comprises one of said outer strands.

10. Apparatus as defined in claim 7, and wherein:
said one of said cable strands comprises said core strand.

11. Apparatus as defined in claim 7, and wherein:
said one of said cable strands comprises one of said outer strands.

* * * * *